US005969779A

United States Patent [19]
Kim et al.

[11] Patent Number: 5,969,779
[45] Date of Patent: Oct. 19, 1999

[54] LIQUID CRYSTAL DISPLAY HAVING A REPAIR LINE

[75] Inventors: Dong-Gyu Kim; Byoung-Sun Na, both of Kyungki-do; Won-Hee Lee, Seoul, all of Rep. of Korea

[73] Assignee: Samsung Electronics Co., Ltd., Suwon, Rep. of Korea

[21] Appl. No.: 08/708,224

[22] Filed: Sep. 6, 1996

[30]    Foreign Application Priority Data

Sep. 6, 1995 [KR] Rep. of Korea ................. 95-29150

[51] Int. Cl.[6] ................. G02F 1/136; G02F 1/1343
[52] U.S. Cl. ................................. 349/54; 349/143
[58] Field of Search ........................... 349/54, 122, 55, 349/138, 92, 139, 143, 40, 42, 43; 257/59, 72; 345/92, 93

[56]    References Cited

U.S. PATENT DOCUMENTS 5,767,929  6/1998  Yachi et al. .................. 349/139

Primary Examiner—Hung Dang
Assistant Examiner—Tai V. Duong
Attorney, Agent, or Firm—Pillsbury Madison & Sutro LLP

[57]    ABSTRACT

The present invention reduces overall electrostatic capacity by effectively reducing capacitor surface area. In one embodiment, each data line is formed so that it directly intersects or overlaps a repair line that surrounds the LCD screen a single time at an end of the data line corresponding to a data line input pad. The other end of the data line does not intersect with the repair line, but instead uses a conductive layer that overlaps this other end of the data line at one end and the repair line at another end. In another embodiment, a plurality of repair lines that each surround the LCD screen are used. Groups of data lines are associated with one repair line and the widths of the data lines are narrowed if the data line intersects a repair line that it is not associated with. Accordingly, by preventing one end of a data line from intersecting with a repair line, or by reducing the width of data lines which cross a non-associated repair line when a plurality of repair lines are used, the overall electrostatic capacity is reduced.

7 Claims, 10 Drawing Sheets

LIQUID CRYSTAL DISPLAY HAVING A REPAIR LINE

BACKGROUND OF THE INVENTION

(1) Field of Invention

The present invention relates in general to a liquid crystal display, and more particularly, to a liquid crystal display having a repair line.

(2) Description of Related Art

A thin film transistor TFT liquid crystal display LCD is a display which uses a TFT for a switching element and uses the electro-optical effect of a liquid crystal material to create an image. Such an LCD, for each pixel, includes a TFT and a pixel electrode, a gate line to provide a switching signal to the pixel, a TFT substrate in which a data line is formed to provide a picture signal, a color filter substrate in which a common electrode and color filter are formed, and a liquid crystal material intervened between them.

Gate lines and data lines providing signal paths to a pixel are formed in the TFT substrate of an LCD, but are apt to be broken in the process of creating product. If such lines are broken, the LCD may not perform properly as a display.

One conventional method of solving this problem is to use a repair line in place of a broken wire when the break occurs after forming an enclosed curve type repair line around a screen formed of pixels. This intersects with gate lines and data lines with a gate insulating layer between them.

Reference will now be made in detail to a conventional LCD, an example of which is illustrated in the accompanying drawings.

Figure 1:
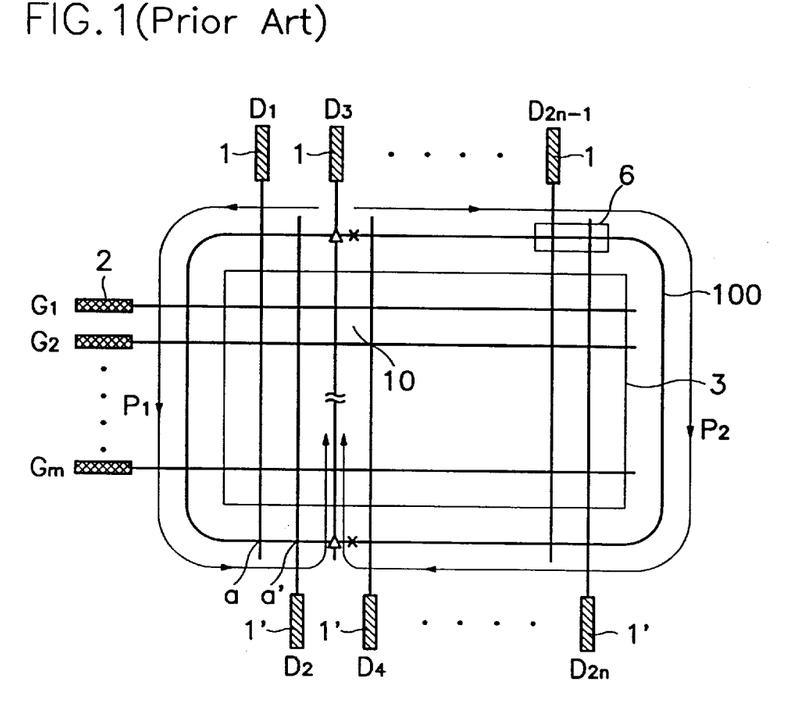
FIG. 1 is a plan view illustrating a conventional LCD wherein a repair line is formed as an enclosed curve around a screen.
Figure 2:
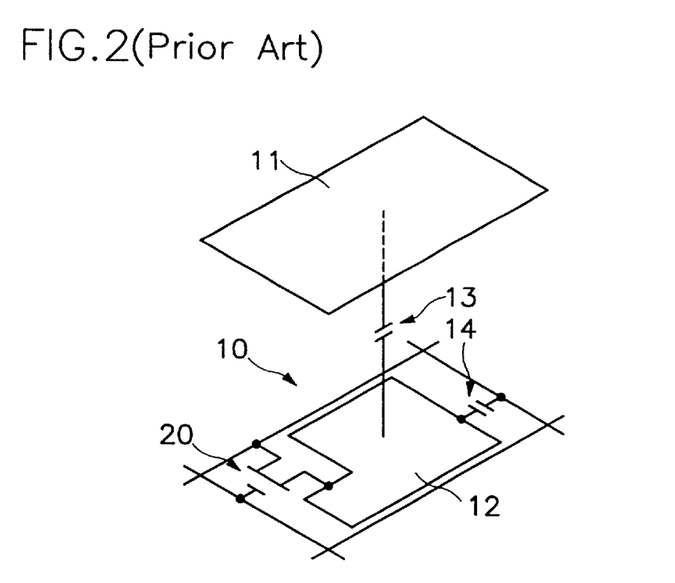
FIG. 2 is an equivalent circuit diagram of a general pixel.
Figure 3:
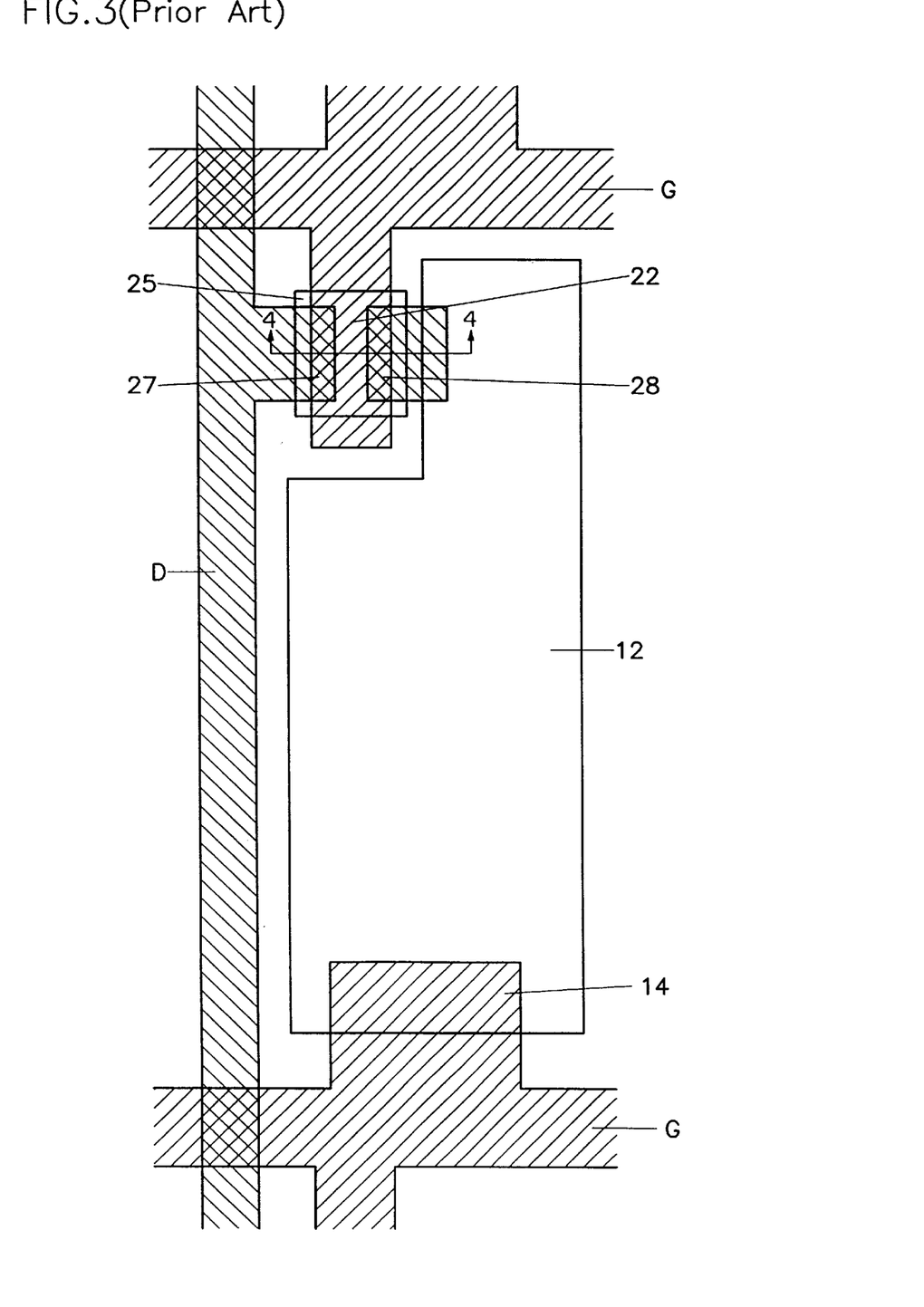
FIG. 3 is a plan view illustrating the layout of the lower substrate in FIG. 2.
Figure 4:
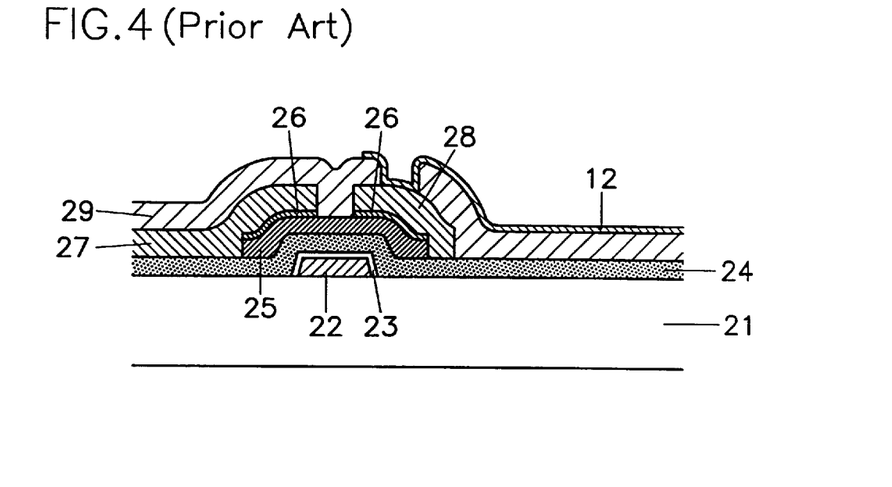
FIG. 4 is a sectional view illustrating a section view taken along line A—A of FIG. 3.
Figure 5:
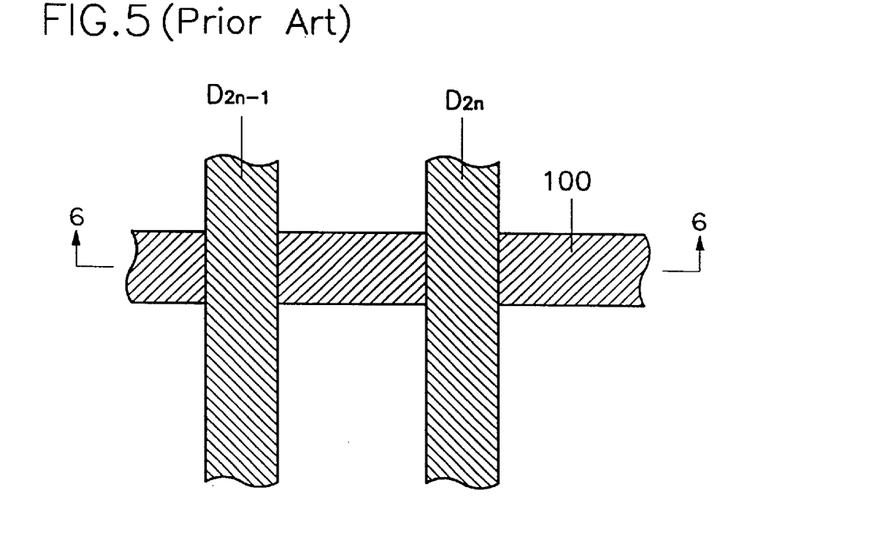
FIG. 5 is a diagram illustrating in greater detail portion 6 of FIG. 1.
Figure 6:
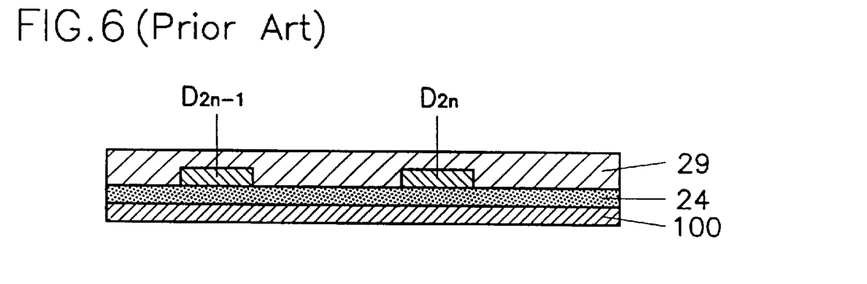
FIG. 6 is a sectional view illustrating a section taken along line B—B of FIG. 5.

FIG. 1 is a plan view illustrating a conventional LCD wherein a repair line is formed as an enclosed curve around a screen, FIG. 2 is an equivalent circuit diagram of a general pixel. FIG. 3 is a plan view illustrating the layout of the lower substrate in FIG. 2. FIG. 4 is a sectional view illustrating a section cut along A—A line in FIG. 3. FIG. 5 is a diagram illustrating in greater detail portion 6 of FIG. 1, and FIG. 6 is a sectional view illustrating a section along the B—B line of FIG. 5.

In a general LCD, as illustrated in FIG. 1, gate lines $G_1$, $G_2$, ... $G_m$ are formed in parallel and data lines $D_1$, $D_2$, $D_3$, $D_4$, ... $D_{2n-1}$, $D_{2n}$ intersecting perpendicular to them are formed.

Input pads 1, 1', 2 are formed on each row of data lines $D_1$, $D_2$, $D_3$, $D_4$, ... $D_{2n-1}$, $D_{2n}$ and gate lines $G_1$, $G_2$, ..., $G_m$. The data lines may be divided into several first data lines $D_1$, $D_3$, ... $D_{2n-1}$ in which each input pad 1 is formed in the upper part of the LCD and second data lines $D_2$, $D_4$, ... $D_{2n}$ in which each input pad 1' is formed in the lower part of the LCD. Pixels 10 are formed in the spaces at which the gate lines $G_1$, $G_2$, ..., $G_m$ and data lines $D_1$, $D_2$, $D_3$, $D_4$, ... $D_{2n-1}$, $D_{2n}$ meet.

As illustrated in FIG. 2, each pixel 10 includes a switching element, generally TFT 20, a liquid crystal storage capacitor 13, and a holding capacitor 14. Liquid crystal storage capacitor 13 is formed by a lower pixel electrode 12, an upper common electrode 11 and liquid crystal material between them. Such a pixel 10 is connected to one data line and one gate line through TFT 20.

A lay-out of the upper portion of the pixel electrode and a section of TFT 20 corresponding to the upper part of a pixel having a structure as in FIG. 2 is illustrated in FIGS. 3 and 4.

On a transparent insulating substrate 21, a gate line G and a gate electrode 22 which are connected to it are formed. A gate oxide film 23 is formed over each gate line G and gate electrode 22. A gate insulation layer 24 covers oxide film 23, and substrate 21. Over the gate insulation layer 24, at the portion covering the gate electrode 22, is formed a semiconductor layer 25. Generally, on the semiconductor layer, which is typically formed of amorphous silicon, two divided contact layers 26 are formed, typically of $n^+$ amorphous silicon. A source electrode 27 of the TFT connects to the data line D and covers one of the contact layers 26. A drain electrode 28 separated from the source electrode 27 and connected to the pixel electrode 12 covers the other contact layer 26. The contact layers serve to improve the electric connection from the semiconductor layer 25 to the source and drain electrodes 27, 28.

FIG. 1 illustrates a repair line 100 formed in a enclosed curve around a screen 3 formed of pixels 10. Such a repair line 100 intersects with each gate line $G_1$, $G_2$, ..., $G_m$ around a input pad 2 and each data line $D_1$, $D_2$, $D_3$, $D_4$, ... $D_{2n-1}$, $D_{2n}$ a first time around the input pad 1, 1' and a second time at the opposite end of the data line. Each data line $D_1$, $D_2$, $D_3$, $D_4$, ... $D_{2n-1}$, $D_{2n}$ has the same width throughout. Also, data lines $D_1$, $D_2$, $D_3$, $D_4$, ... $D_{2n-1}$, $D_{2n}$ and repair lines have a same intersecting area respectively.

Reference will be made to FIGS. 5 and 6, which illustrates the intersecting of data lines $D_{2n-1}$, $D_{2n}$ and a repair line 100.

As illustrated in FIGS. 5 and 6, a first data line $D_{2n-1}$ and a second data line $D_{2n}$ has a same intersecting area with a repair line 100. If considering FIG. 6 as a cross section along the B—B line of FIG. 5, a gate insulation layer 24 formed on the repair line 100 insulates repair line 100 from the data lines $D_{2n-1}$, $D_{2n}$. A protective film 29 is formed on the data lines $D_{2n-1}$, $D_{2n}$. Accordingly, the intersecting area between the data lines $D_{2n-1}$, $D_{2n}$ and the repair line 100 acts as an undesired capacitor and parallel connected capacitors result.

During operation of an LCD as described above, if a switching signal is applied to each pixel 10 in turn through gate lines $G_1$, $G_2$, ..., $G_m$, a picture signal is applied to the corresponding pixel 10 through data lines $D_1$, $D_2$, $D_3$, $D_4$, ... $D_{2n-1}$, $D_{2n}$ and provides an image in accordance with it. However, if a data line such as $D_3$ is disconnected as illustrated in FIG. 1, the picture signal applied through the data line $D_3$ reaches the disconnected point but does not reach the next point. Thus, this picture signal cannot be applied to a pixel connected to the data line $D_3$ below the break or disconnect point illustrated with the symbol "//".

If the data line $D_3$ is repaired using a repair line 100, the signal reaches the data line $D_3$ below the disconnected point. Referring to FIG. 1, the area indicated with Δ, where the data line $D_3$ and the repair line 100 intersect, is short-circuited using a laser. A signal applied from a input pad 1 in a pixel connected to the data line $D_3$ below the disconnected point, after passing through the upper of the disconnected intersecting area, moves along the left path of the data line $D_3$ through the repair line 100 connected with the data line $D_3$ (path P1) or along the right path (path $P_2$). However, because the path $P_2$ is longer than the path $P_1$ and intersects with many data lines, it can less efficiently transmit signals. Thus, it is necessary to prevent signals from being transmitted through path $P_2$. To accomplish this, the part from the break or disconnection position Δ to the path $P_2$ is cut off, as indicated with an x. Therefore, it is possible to apply signals through the path $P_1$ of the repair line 100 into the data line $D_3$ below the disconnected point.

A signal applied through the path $P_1$ must pass through the intersecting areas a, a' between data lines $D_1$, $D_2$ and the repair line 100. These areas a, a', as noted above, act as capacitors and distort picture signals passing through the repair line 100. Particularly, if the size of screen is large and the number of data lines and gate lines increase, the number of intersecting areas and capacitors along the signal path increase and the overall electrostatic capacity grows. Because the length of the repair line 100 is also increased, the resistance increases. Consequently, distortion of the signals transferring through the repair line 100 undesirably occurs.

In order to reduce such signal distortion, the overall electrostatic capacity should be reduced. Since the number of the wires cannot be reduced, the electrostatic capacity of the capacitors formed by the intersecting areas between the repair line 100 and data lines $D_1, D_2, D_3, D_4, \ldots D_{2n-1}, D_{2n}$ should be reduced. Because the electrostatic capacity of these capacitors is proportional to the size of the intersecting area and is inversely proportional to the perpendicular length between the repair line 100 and data lines $D_1, D_2, D_3, D_4, \ldots D_{2n-1}, D_{2n}$, in order to reduce the electrostatic capacity, the size of intersecting areas should be decreased, or the perpendicular length between the repair line 100 and data lines $D_1, D_2, D_3, D_4, \ldots D_{2n-1}, D_{2n}$ should be increased.

However, because the size of the intersecting areas should be maintained in order to ensure a short-circuit occurs in the intersecting area when laser fusing takes place, it is difficult to decrease the size of the intersecting area and to increase the perpendicular length between the repair line 100 and data lines $D_1, D_2, D_3, D_4, \ldots D_{2n-1}, D_{2n}$.

SUMMARY OF THE INVENTION

An object of the present invention is to overcome problems with conventional repair lines and to efficiently perform the function of repairing broken data lines without adversely affecting quality.

To achieve the above recited object, among others, the present invention reduces overall electrostatic capacity by effectively reducing capacitor surface area.

In one embodiment, each data line is formed so that it directly intersects or overlaps a repair line that surrounds the LCD screen a single time at an end of the data line corresponding to a data line input pad. The other end of the data line does not intersect with the repair line, but instead uses a conductive layer that overlaps this other end of the data line at one end and the repair line at another end. Thus, this conductive layer can be fused in two places to perform a repair operation, but if a repair operation is not needed, since the data line does not directly intersect with the repair line, the overall electrostatic capacity is reduced.

In another embodiment, a plurality of repair lines that each surround the LCD screen are used. Groups of data lines are associated with one repair line and the widths of the data lines are narrowed if the data line intersects a repair line that it is not associated with. Accordingly, the width of the data lines that intersect an associated repair line is still wide enough to perform using operation if needed, but by reducing the width of data lines where they intersect non-associated repair lines, the overall electrostatic is reduced.

DETAILED DESCRIPTION OF THE PREFERRED EMBODIMENT

The preferred embodiment of the invention will now be discussed, including an example illustrated by the accompanying drawings. Wherever possible, the same reference characters will be used throughout the drawings to refer to the same or like parts.

Figure 7:
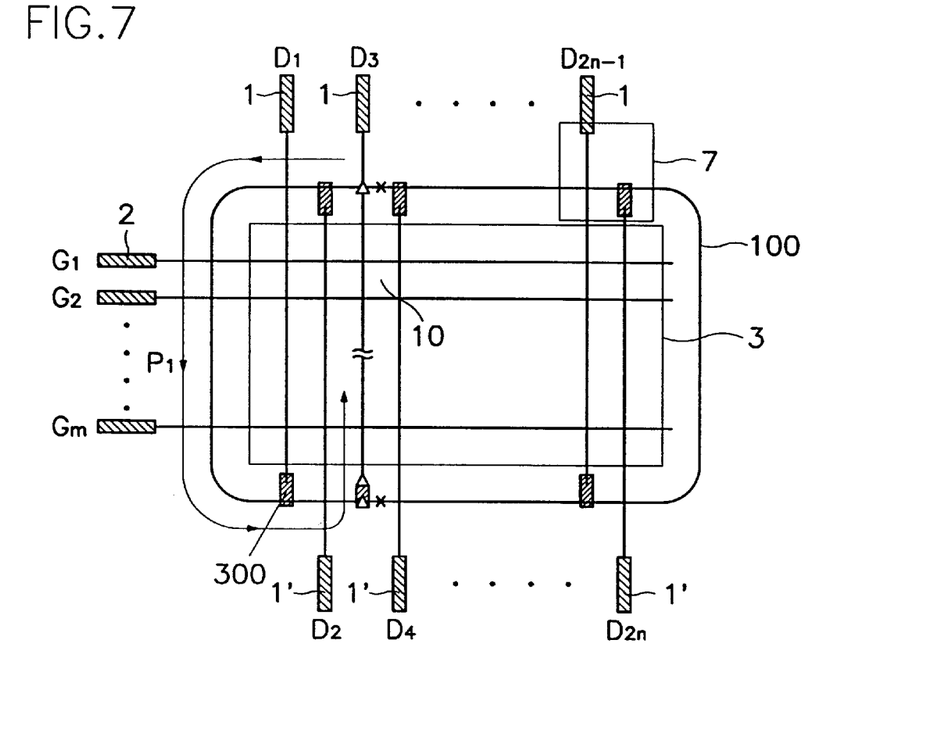
FIG. 7 is a plan view illustrating an LCD according to the first preferred embodiment of the present invention.
Figure 8:
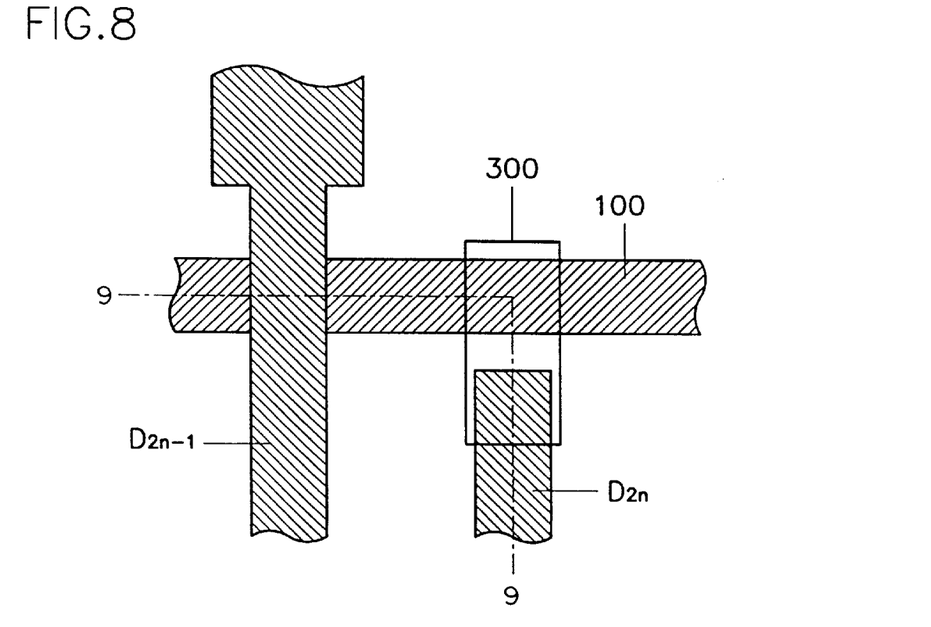
FIG. 8 is a diagram illustrating in greater detail portion 7 of FIG. 7.
Figure 9:
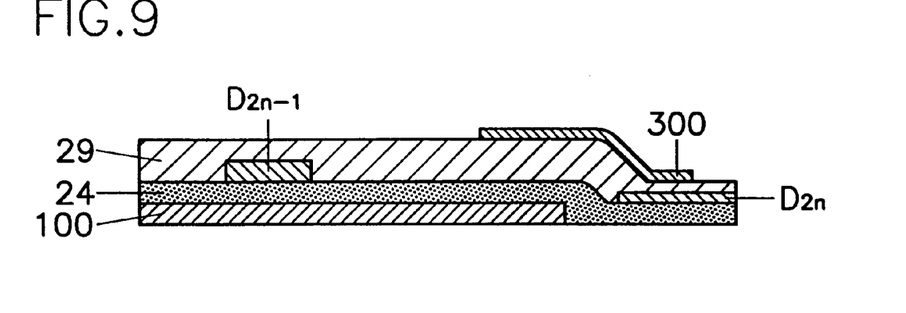
FIGS. 9 and 10 are sectional views illustrating different embodiments in a section taken along line C—C of FIG. 8.
Figure 10:
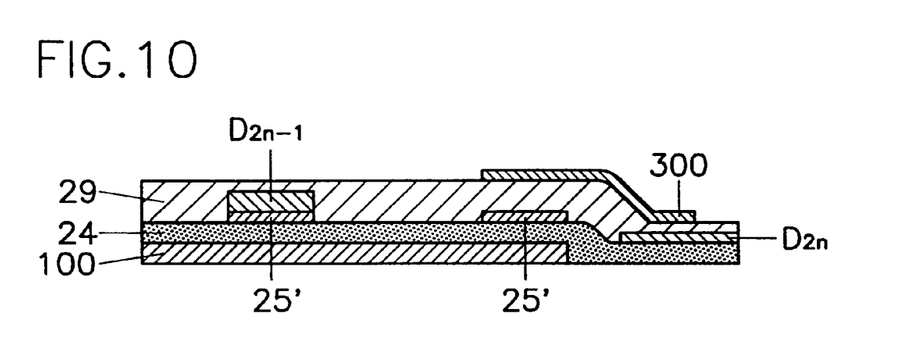

FIG. 7 is a plan view illustrating an LCD according to the first preferred embodiment of the present invention, FIG. 8 is a diagram illustrating portion 7 of FIG. 7 in greater detail, and FIGS. 9 and 10 are sectional views illustrating two embodiments of the present invention along a C—C section line in FIG. 8.

An LCD according to this preferred embodiment of the present invention is formed so that the direct intersecting between a repair line 100 and each data line $D_1, D_2, D_3, D_4, \ldots D_{2n-1}, D_{2n}$ occurs only one time for each input pad 1, 1'. The opposite ends of each data line $D_1, D_2, D_3, D_4, \ldots D_{2n-1}, D_{2n}$ do not reach the repair line 100.

Referring to FIGS. 8 to 10, the opposite end of each data line 1, 1' does not reach the repair line 100. Instead, the repair line 100 intersects with a conductive layer 300 with the protective film 29 in between which, in turn, intersects with the opposite end of a data line. As conventionally done, the repair line 100 is insulated from the data lines by a gate insulating layer 24. A protective film 29 encapsulates the data lines. As shown in FIG. 10, the intersecting between the conductive layer 300 and the repair line 100 can advantageously include an intersecting semiconductor layer 25'. Ultimately, the end of data line $D_{2n}$ opposite the input pad and the repair line are connected using two series capacitors that are each fused together. As also illustrated in FIGS. 9 and 10, between the repair line 100 and a data line $D_{2n-1}$, the intersecting area semiconductor layer 25' is also formed for the intersecting of an adjacent data line having an input pad 1' on the opposite end as the input pads 1.

Suppose that the width of conductive layer 300 is the same as that of the data line, the thickness of the gate insulating layer 24 is the same as that of the protective film 29 where the protective film is between conductive layer 300 and the repair line, and the electrostatic capacity $C_0$ is generated by the result of the data line $D_{2n-1}$ intersecting with the repair line 100. Therefore, because the electrostatic capacity of each of the two capacitors shown in FIGS. 5 and 6 are $C_0$ respectively, the overall electrostatic capacity $C_1$ without their being connected when a conventional repair circuit is used becomes $$C_1 = C_0 + C_0 = 2C_0$$

When the electrostatic capacity according to the preferred embodiment of the present invention is calculated, the electrostatic capacity generated by the conductive layer 300 intersecting with the repair line 100 is Co/2 and the electrostatic capacity generated by the conductive layer 300 intersecting with the data line $D_{2n}$ is $C_0$. Therefore, the electrostatic capacity of these two capacitors without their being connected with each other, in series, is:

$$\frac{1}{2/C_0 + 1/C_0} = C_0/3$$

Also, the electrostatic capacity generated by the conductive layer 300 intersecting with the data line $D_{2n}$ is $C_0$, the overall electrostatic capacity $C_2$ is:

$$C_2 = \frac{C_0}{3} + C_0 = \frac{4}{3}C_0$$

Accordingly, if comparing the electrostatic capacity according to the preferred embodiment of the present invention with the electrostatic capacity of a conventional LCD, it is as follows:

$$\frac{C_2}{C_1} = \frac{4/3}{2} = 2/3$$

Consequently, the preferred embodiment of the present invention reduces the overall electrostatic capacity by ⅔ or more in comparison with a conventional LCD.

When disconnection occurs, the repair method is as follows. As illustrated in FIG. 7, suppose that a data line $D_3$ is disconnected. The disconnect point is expressed by the symbol "//". In such a case, since a picture signal applied through the data line $D_3$ reaches the disconnected point but no further, the picture signal is not applied to a pixel 10 connected with the data line $D_3$ below the disconnected point.

If the data line $D_3$ is repaired using the repair line 100, the intersecting area between the data line $D_3$ and the repair line 100 indicated with Δ is short-circuited by laser. Also, because the opposite end of the data line is connected with the repair line 100 via conductive layer 300, the repair line 100 and the conductive layer 300 are short-circuited by laser and the conductive layer 300 and the opposite end of data line $D_3$ are short-circuited by laser. Finally, the point indicated with an x is cut so that the signal from the input pad 1 may reach the disconnected point only via path $P_1$.

Now, reference will be made to FIGS. 3, 4 and 11 to explain how to make an LCD according to the preferred embodiment of the present invention.

Figure 11:
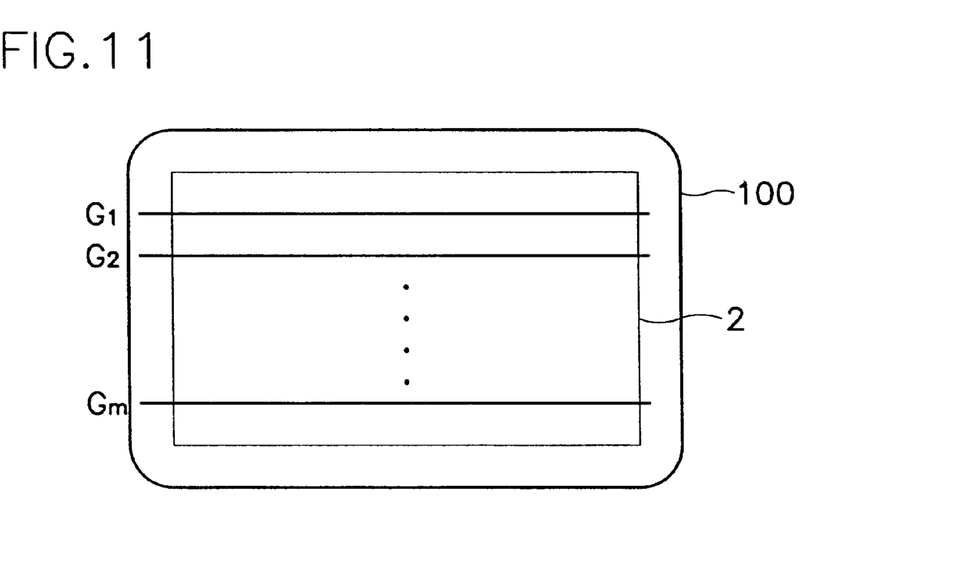
FIGS. 11 to 13 are plan views illustrating a manufacturing method of an LCD according to the first preferred embodiment of the present invention.

As illustrated in FIGS. 3, 4 and 11, gate lines $G_1$, $G_2$, . . . , $G_m$, respectively connected gate electrodes 22, and a repair line 100 are formed by laminating and photoengraving a metal as aluminum Al, aluminum alloy, chromium Cr and tantalum Ta on a transparent insulated substrate 21. So that the repair line 100 and the gate lines $G_1$, $G_2$, . . . , $G_m$ are not short-circuited, the gate lines $G_1$, $G_2$, . . . , $G_m$ do not have their whole length and input pads 2 in FIG. 7 of the gate lines $G_1$, $G_2$, . . . , $G_m$ are not formed (See FIG. 11).

It is desirable to form an anode oxidation film 23 as shown in FIG. 4 by anode oxidation to this structure, the ends of the gate lines $G_1$, $G_2$, . . . , $G_m$ that will be subsequently connected with the remainder of the respective gate lines $G_1$, $G_2$, . . . , $G_m$ and their input pads 2.

Then, a gate insulating layer 24 is formed by laminating a material as silicon nitride $SiN_x$ and silicon oxidation $SiO_2$ throughout. The insulating layer 24 is removed on the end of the gate lines $G_1$, $G_2$, . . . $G_m$ at the desired input pads locations. Thereafter, an amorphous silicon is laminated throughout. If desired, an $n^+$ amorphous silicon can also be laminated over the amorphous silicon so that a good electric contact results between the subsequently formed source and drain electrodes 27, 28, and this semiconductor layer.

A semiconductor layer 25 and contact layer 20 covering each gate electrode 22 is formed by photoengraving the $n^+$ amorphous silicon layer and amorphous silicon. An intersecting area of semiconductor layer 25' may be left at an intersecting area for conductive layer 300 to assist with short-circuiting repair line 100 and conductive layer 300.

Figure 12:
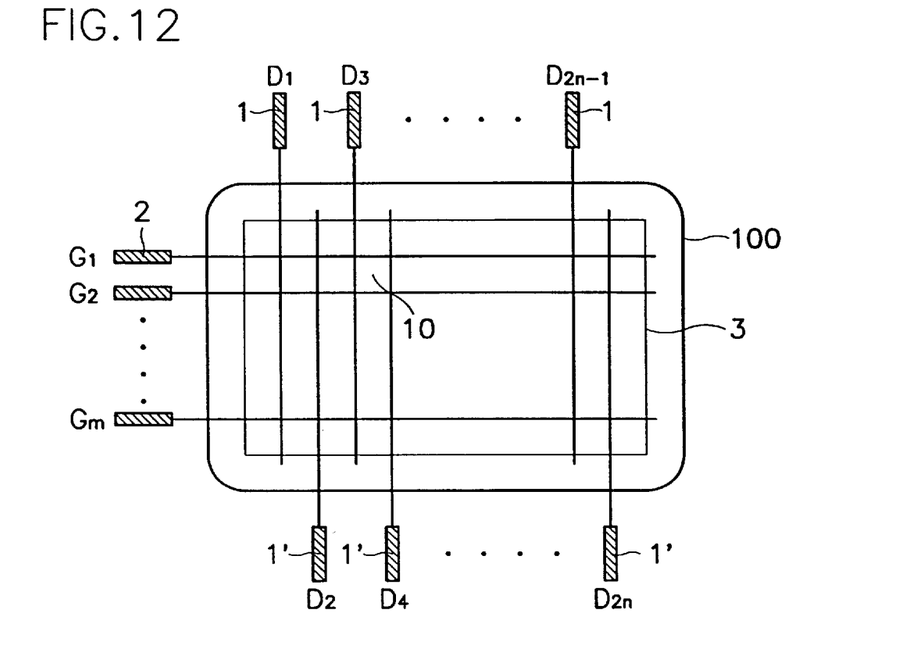

As illustrated in FIGS. 3, 4 and 12, by laminating and photoengraving a metal such as Cr, Ta, or titanium Ti, data lines $D_1$, $D_2$, $D_3$, $D_4$, . . . $D_{2n-1}$, $D_{2n}$, and data line input pads 1, 1', source and drain electrodes 27, 28, gate line input pads 2 and a part of the connected gate line are formed. The end of the data lines $D^1$, $D_2$, $D_3$, $D_4$, . . . $D_{2n-1}$, $D_{2n}$ should be formed so that their opposite ends do not reach the repair line 100.

A protective film 29 is formed by using a material as $SiN_x$, and the protective film 29 on the drain electrode 28 is removed photoengraving (See FIG. 4).

Figure 13:
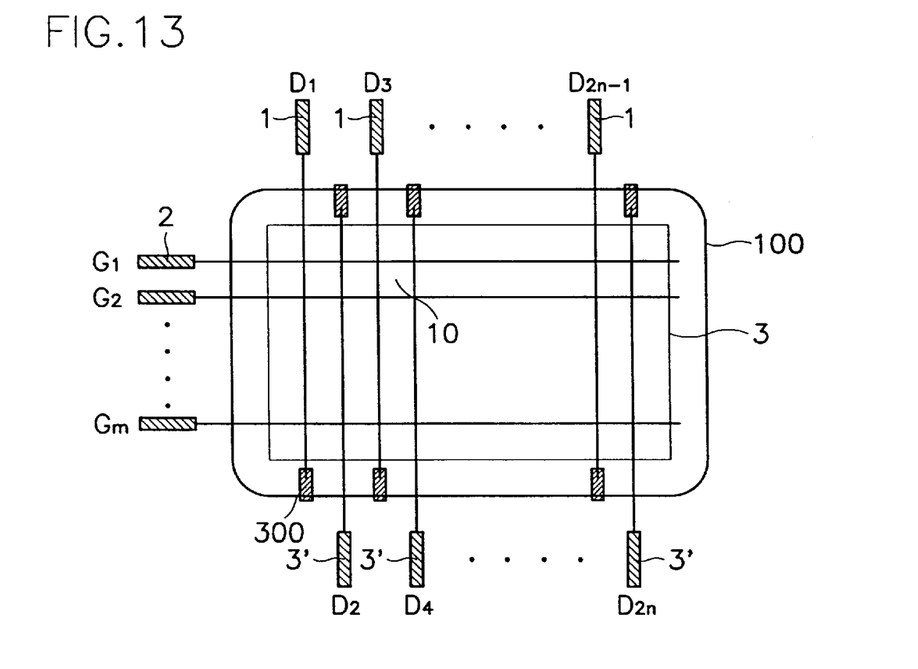

Finally, as illustrated in FIGS. 3, 4 and 13, by laminating and photoengraving a transparent conductive material such as indium tin oxide ITO, a pixel electrodes 12, a conductive layers 300 laid on the protective film 29 and over the repair line 100, data lines $D_1$, $D_2$, $D_3$, $D_4$, . . . $D_{2n-1}$, $D_{2n}$ and the end of the input pads 1, 1' are formed.

Consequently, if the repair line 100 and the data line $D_1$, $D_2$, $D_3$, $D_4$, . . . $D_{2n-1}$, $D_{2n}$ are formed according to such a method, it is possible to avoid the distortion of the signal by reducing the overall electrostatic capacity.

Now, reference will be made to FIGS. 14 and 17 to explain another preferred embodiment of the present invention.

This preferred embodiment differs from the first preferred embodiment by dividing data lines into several groups and has an exclusive repair line for each group.

Figure 14:
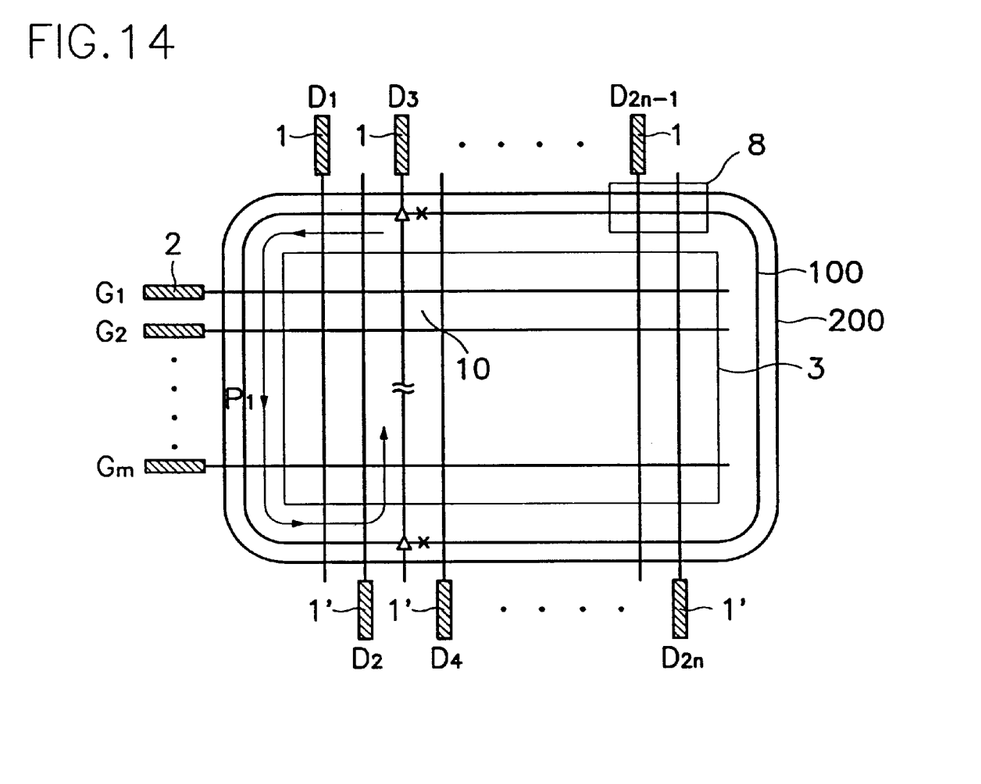
FIG. 14 is a plan view illustrating an LCD according to the second preferred embodiment of the present invention.
Figure 15:
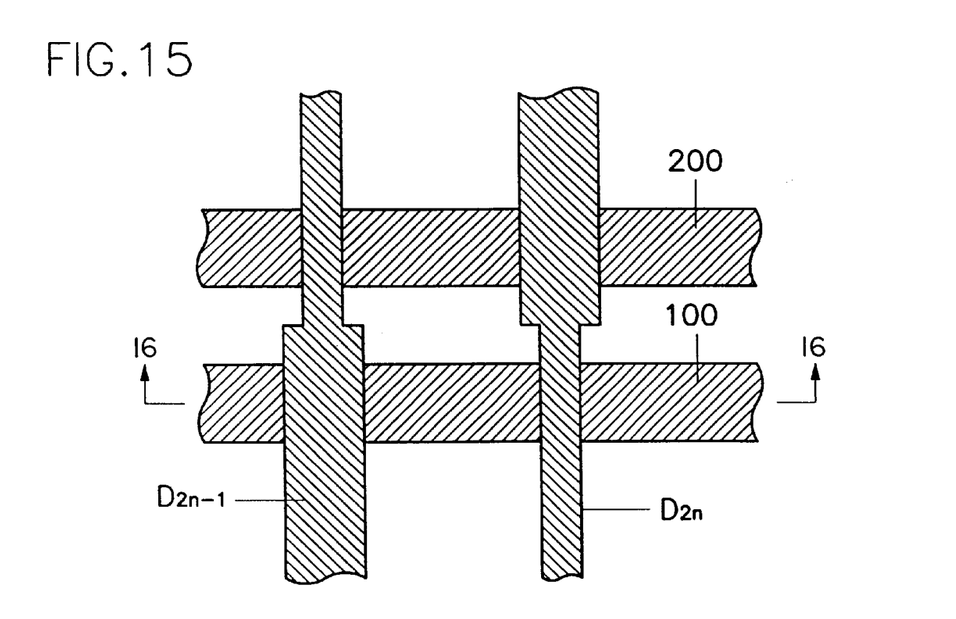
FIG. 15 is a diagram illustrating in greater detail portion 8 of FIG. 14.
Figure 16:
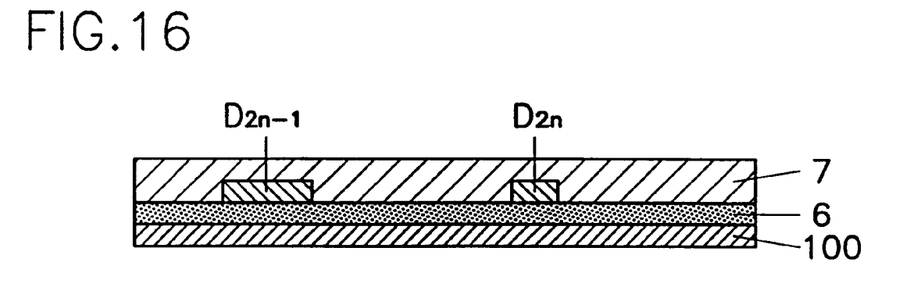
FIGS. 16 and 17 are sectional views illustrating different embodiments in a section taken along line D—D of FIG. 15.
Figure 17:
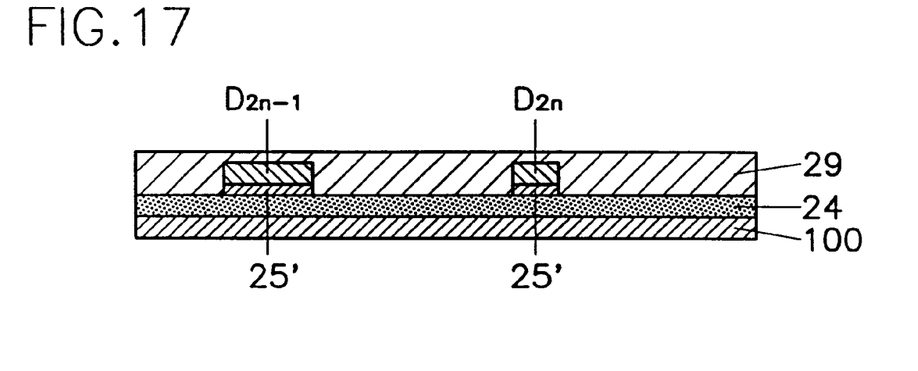

FIG. 14 is a plan view illustrating an LCD according to the second preferred embodiment of the present invention, FIG. 15 is a diagram illustrating in greater detail portion 8 in FIG. 14, FIGS. 16 and 17 are sectional views illustrating two embodiments by a D—D line section in FIG. 15.

In an LCD according to the preferred embodiment illustrated in FIG. 14, repair lines 100, 200 are formed in duplicate around the circumference of an LCD screen. Though illustrating the repair lines 100, 200 formed in duplicate in FIG. 14, the repair lines may be formed in triplicate, quadruplex or more.

When the inside repair line 100 is termed the first repair line and the outside repair line 200 is termed the second repair line, the first repair line 100 is used as the exclusive repair line for first data lines $D_1, D_3, \ldots D_{2n-1}$ and the second repair line 200 is used as the exclusive repair line for second data lines $D_2, D_4, \ldots, D_{2n}$. As in FIGS. 15 to 17, the size of the intersecting area between each data line $D_1$, $D_2, D_3, D_4, \ldots D_{2n-1}, D_{2n}$ and the associated repair line maintains the minimum size needed to short-circuit elements if needed. The size of the intersecting area of each data line $D_1, D_2, D_3, D_4, \ldots D_{2n-1}, D_{2n}$, and the non-associated repair line is smaller by adjusting the width of the first data lines so they are larger at an area where a short-circuit may be needed.

Then, when disconnection occurs in an LCD having such a structure, the method used to repair it is as follows.

As illustrated in FIG. 14, suppose that the first data line $D_3$ is disconnected. The disconnected point is again illustrated with "//". Because a picture signal applied through the first data line $D_3$ reaches the disconnected point but does not reach the pixels past that point.

Thus, suppose that the data line $D_3$ is repaired using the repair lines 100, 200. Because the exclusive repair line for the first data lines $D_1, D_3, \ldots, D_{2n-1}$ is the first repair line 100, the intersect area between the first data line $D_3$ and the repair line 100 indicated by $\Delta$ is short-circuited using a laser. If the point indicated with x is cut off, the signal from the input pad 1 may reach the disconnected point via a path $P_1$ of the first repair line 100.

If one of the second data lines $D_2, D_4, \ldots, D_{2n}$ is disconnected, the signal may flow via the second repair line 200 by short-circuiting the intersecting area between the second repair line 200 and the disconnected data line.

If the size of the intersecting area between each data line $D_1, D_2, D_3, D_4, \ldots D_{2n-1}, D_{2n}$ and the non-associated repair line is one-half the size of the intersecting area between each data line $D_1, D_2, D_3, D_4, \ldots D_{2n-1}, D_{2n}$ and the associated repair line the electrostatic capacity of the first repair line 100 or the second repair line 200 is as follows.

Since the electrostatic capacity of the intersecting area between each data line $D_1, D_2, D_3, D_4, \ldots D_{2n-1}, D_{2n}$ and the non-associated repair line is $C_0/2$, the electrostatic capacity $C_3$ of the two capacitors is:

$$C_3 = \frac{C_0}{2} + C_0 = \frac{3}{2}C_0$$

Accordingly, if comparing the electrostatic capacity according to the preferred embodiment of the present invention with the electrostatic capacity of a conventional LCD, it is as follows:

$$\frac{C_3}{C_1} = \frac{3/2}{2} = 3/4$$

Consequently, this preferred embodiment of the present invention brings about an effect that the overall electrostatic capacity is reduced ¾ or more in comparison with a conventional LCD.

If each data line $D_1, D_2, D_3, D_4, \ldots D_{2n-1}, D_{2n}$ is divided into three groups to form an associated repair line for each group, the electrostatic capacity $C_4$ of three series connected capacitors formed in succession is:

$$C_4 = 2 \times \frac{C_0}{2} + C_0 = 2C_0$$

Thus, because the conventional electrostatic capacity is $3C_0$, the overall electrostatic capacity is reduced ⅔ in comparison with the conventional electrostatic capacity.

Accordingly, if dividing each data line $D_1, D_2, D_3, D_4, \ldots D_{2n-1}, D_{2n}$ into 1 groups and forming 1 repair lines, the overall electrostatic capacity is:

$$(l-1) \times \frac{C_0}{2} + C_0 = \frac{(l+1)}{2}C_0$$

In comparison with the conventional electrostatic capacity, it is reduced by:

$$\frac{(l+1)}{2} \times \frac{1}{l} = \frac{l+1}{2l}$$

Now, the reference will be made to FIGS. 3, 4, 18 and 19 to explain how to make a TFT for an LCD according to the second preferred embodiment of the present invention.

Figure 18:
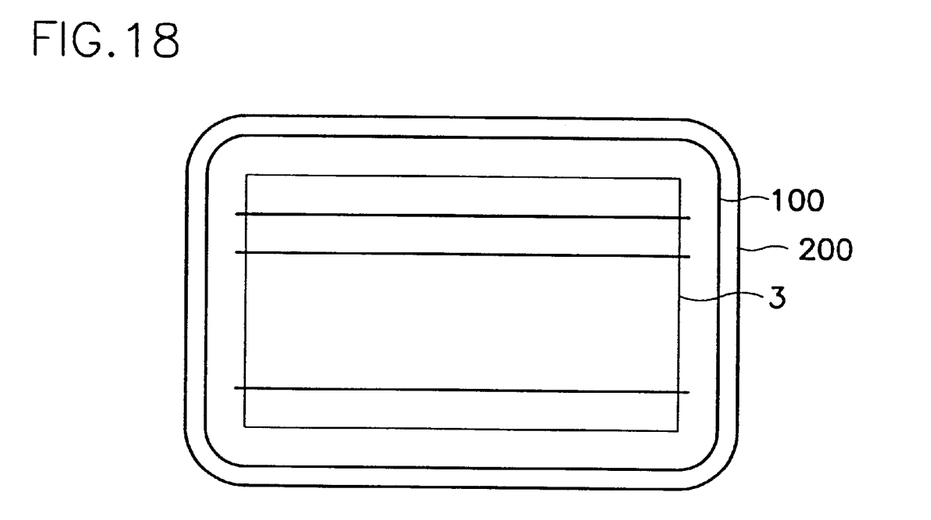
FIGS. 18 and 19 are plan views illustrating the manufacturing method for an LCD according to the second preferred embodiment of the present invention.

As illustrated in FIGS. 3, 4 and 18, gate lines $G_1, G_2, \ldots, G_m$, gate electrodes 22 respectively connected with them and repair lines 100, 200 are formed by laminating and photoengraving a metal as aluminum Al, aluminum alloy, chromium Cr and tantalum Ta on transparent insulated substrate 21. So that the repair lines 100, 200 and the gate lines $G_1, G_2, \ldots G_m$ are not short-circuited, the gate lines $G_1, G_2, \ldots G_m$ do not have their whole length and input pads 2 formed. It is desirable to form an anode oxidation film 23 as shown in FIG. 4 to the structure except at the end of the gate line $G_1, G_2, \ldots, G_m$ that will be subsequently connected with the remainder of the respective gate lines $G_1, G_2, \ldots, G_m$ and their input pads 2.

Then, a gate insulating layer 24 is formed by laminating a material as silicon nitride $SiN_x$ and silicon oxidation $SiO_2$ throughout. The insulating layer 24 is removed at the desired input pad locations $G_1, G_2, \ldots, G_m$, with which the end of the gate lines $G_1, G_2, \ldots, G_m$ and the input pad (the drawing code 2 in FIG. 7).

Thereafter, an amorphous silicon is laminated throughout. If desired, an, $n^+$ amorphous silicon can also be laminated over the amorphous silicon so that a good electric contact results between the subsequently formed source and drain electrodes 27, 28 and semiconductor layer.

A semiconductor pattern 25 and contact layer 26 covering each gate electrode is formed by photoengraving the $n^+$ amorphous silicon layer and amorphous silicon. An intersecting area of semiconductor layer 25 may be left at an intersecting area for conductive layer 300 to assist with short-circuit 2 repair lines and conductive layer 300.

Figure 19:
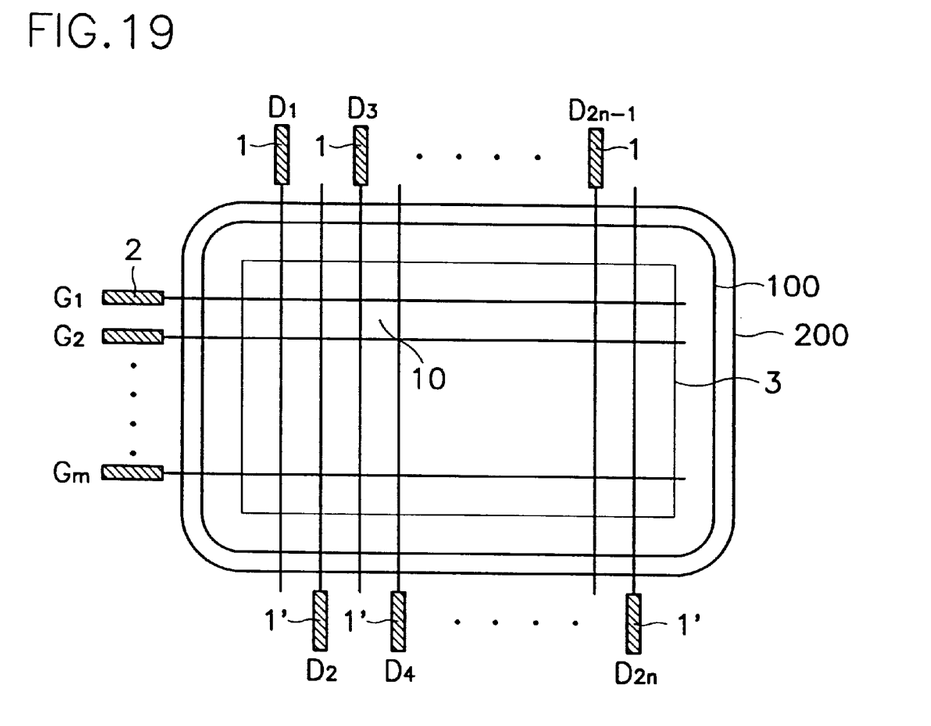

As illustrated in FIGS. 3, 4 and 19, by laminating and photoengraving a metal such as Cr, Ta, titanium Ti, data lines $D_1, D_2, D_3, D_4, \ldots D_{2n-1}, D_{2n}$ and data line input pads 1, 1', source and drain electrodes 27, 28, gate line input pads 2 and a part of the connected gate line are formed. The size of the intersecting area between the first data lines $D_1, D_3, \ldots, D_{2n-1}$ and the first repair line 100 maintains the minimum size to short-circuit, and the size of the intersecting area between the first data lines $D_1, D_3, \ldots, D_{2n-1}$ and the second repair line 200 is formed smaller by adjusting the width of the first data lines $D_1, D_3, \ldots, D_{2n-1}$. The size of the intersecting area between the second data lines $D_2, D_4, \ldots, D_{2n}$ and the second repair line 200 maintains the minimum size to short-circuit, and the size of the intersecting area between the second data lines $D_2, D_4, \ldots, D_{2n}$ and the first repair line 100 is formed smaller by adjusting the width of the second data lines $D_2, D_4, \ldots, D_{2n}$ (See FIGS. 15 to 17).

A protective film 29 is formed throughout by using a material as $SiN_x$, and the protective film 29 on the drain electrode 28 is removed by photoengraving (See FIG. 4).

Finally, by laminating and photoengraving a transparent conductive material such as indium tin oxide ITO, the drain electrode and a pixel electrodes 12 are formed.

Consequently, if the repair lines 100 and 200 and the data lines $D_1, D_2, D_3, D_4, \ldots D_{2n-1}, D_{2n}$ are formed according to such a method, it is possible to avoid the distortion of signal by reducing the overall electrostatic capacity.

Figure 20:
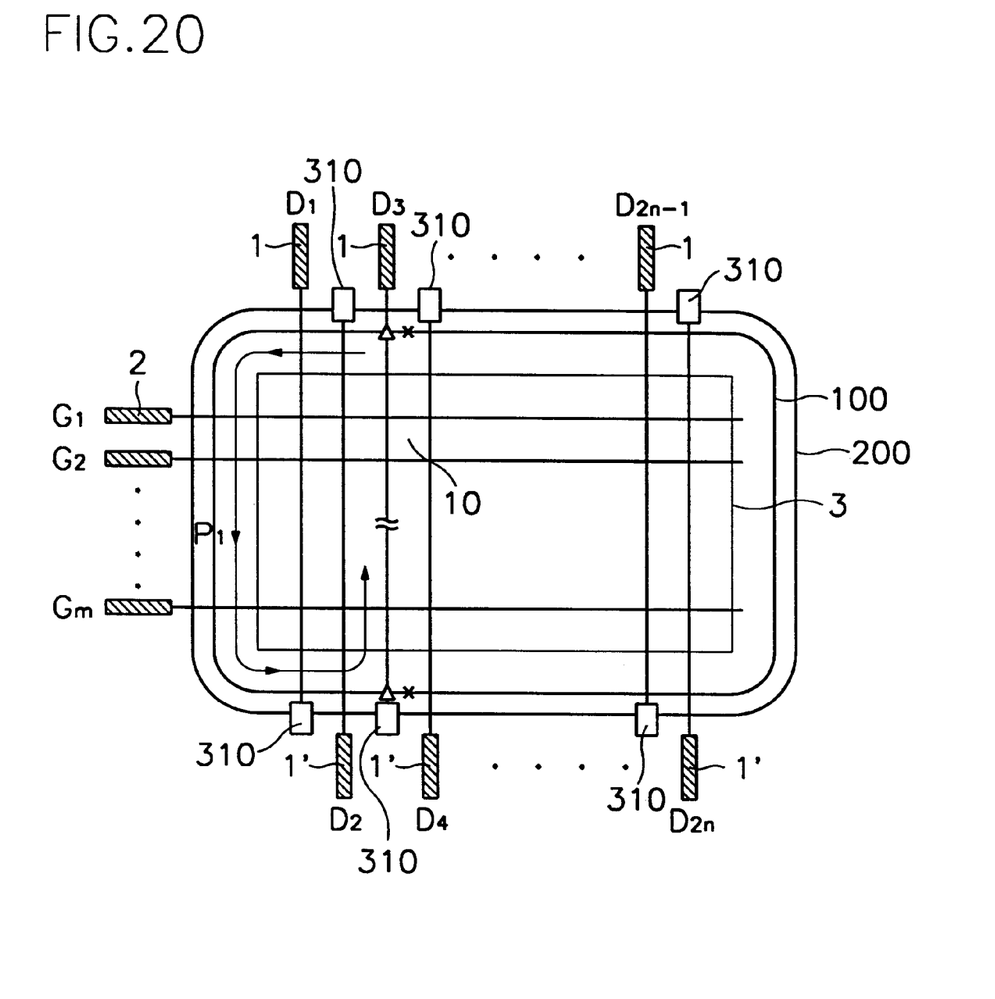
FIG. 20 is a plan view of another embodiment of the invention which uses a plurality of repair lines.

FIG. 20 is a plan view of another embodiment of the invention which uses a plurality of repair lines. In this embodiment, first data lines $D_1, D_3, \ldots, D_{2n-1}$ intersect a first repair line 100 at a first end but not at a second end and intersect second repair line 200 at both ends. Second data lines $D_2, D_4, \ldots, D_{2n}$ intersect second repair line 200 at a first end but not a second end and intersect first repair line 100 at both ends. With this arrangement, each group of data lines can use a repair line and overall electrostatic capacity is further reduced. In a modification of this embodiment, the portion 310 illustrated in FIG. 20 is formed of either an extension of the data line or a protective layer 300, as described in previous embodiments. This modified embodiment offers more versatility, although the overall electrostatic capacity is increased from the non-modified FIG. 20 embodiment.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A portion of a liquid crystal display comprising:
   a substrate;
   a plurality of repair lines formed of conductive material on said substrate,
   a insulating layer covering said repair lines;
   a plurality of substantially parallel data lines formed of conducting material on said insulating layer, each data line having a first end that intersects with each of said repair lines and a second end that does not intersect with at least one of said plurality of repair lines;
   a protective film covering said plurality of data lines and an exposed portion of the insulating layer not covered by the data lines; and
   a plurality of pixel electrodes, each pixel electrode being connected to a respective one of said data lines so that a picture signal can be applied thereto.

2. A portion of a liquid crystal display according to claim 1, wherein said repair lines surround said liquid crystal display.

3. A portion of a liquid crystal display according to claim 1, further including a plurality of individual conductive layers formed on an opposite side of said protective film from said data lines, each conductive layer intersecting with a respective one of said second ends of said data lines that does not intersect with said repair lines and with the respective repair line that does not intersect with the respective one of said second ends of said data lines.

4. A portion of a liquid crystal display according to claim 3, wherein said repair lines surround said liquid crystal display.

5. A portion of a liquid crystal display according to claim 3, further including a semiconductor layer disposed between said data lines and said protective film where said data lines intersect with the repair lines and between at least some of said intersecting areas of said repair lines and said conductive layers.

6. A portion of a liquid crystal display according to claim 1, wherein said plurality of data lines is divided into a first data line group and second data line group;
   wherein said repair lines surround said liquid crystal display; and
   wherein each of said plurality of data lines in said first group has its first end located nearer to a respective second end of said second group than to a respective first end of said second group.

7. A portion of a liquid crystal display according to claim 3, wherein said plurality of data lines is divided into a first data line group and second data line group;
   wherein said repair lines surround said liquid crystal display; and
   wherein each of said plurality of data lines in said first group has its first end located nearer to a respective second end of said second group than to a respective first end of said second group.

* * * * *